Figure 1:
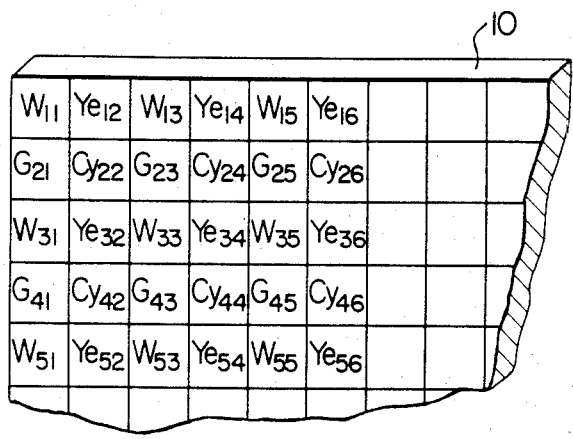

United States Patent [19]

Masuda

[11] Patent Number: 4,504,854
[45] Date of Patent: Mar. 12, 1985

[54] COLOR IMAGE PICKUP DEVICE
[75] Inventor: Michio Masuda, Yokohama, Japan
[73] Assignee: Hitachi, Ltd., Tokyo, Japan
[21] Appl. No.: 290,109
[22] Filed: Aug. 5, 1981
[30] Foreign Application Priority Data Aug. 13, 1980 [JP] Japan .................... 55-110223

[51] Int. Cl.³ .............................. H04N 9/07
[52] U.S. Cl. .................................... 358/44
[58] Field of Search ............... 358/31, 40, 41, 43, 358/44, 48, 163, 213

[56] References Cited

U.S. PATENT DOCUMENTS 3,988,776  10/1976  Shinozaki ................. 358/44
4,117,510   9/1978  Ohta ....................... 358/44
4,291,337   9/1981  Takamura ................. 358/213
4,329,709   5/1982  Masuda .................... 358/44

Primary Examiner—Tommy P. Chin
Attorney, Agent, or Firm—Antonelli, Terry & Wands

[57] ABSTRACT

In a color image pickup device in which an object is imaged on a plurality of photoelectric conversion cells through a plurality of complementary color filters and output signals from the photoelectric conversion cells are subjected to arithmetic operation to produce chrominance signals the bias voltages applied to the photoelectric conversion cells are adjusted according to the transmission characteristics of the associated color filters thereby to prevent distortion of white balance in a reproduced image obtained by a high intensity of object light.

4 Claims, 6 Drawing Figures

COLOR IMAGE PICKUP DEVICE

The present invention relates to a color image pickup device for producing a color television signal, and more particularly to a color television camera in which a plurality of photoelectric conversion element having different spectrum sensitivities are given with the same saturation point of light amount.

A television camera which converts an image of an object to a television signal, is demanded to be simple to handle, small in size and light in weight, especially, when it is combined with a magnetic recording and reproducing apparatus for domestic use. Then, for the purpose, a television camera having a single image pickup tube or solid state image pickup element has been used to produce the color television signal. In such a television camera, a plurality of different color filters are alternately disposed in mosaic or stripe arrangement in front of the image pickup element to produce the color signals. The arrangement of the color filters may be referred to a primary color signal system in which red, green and blue color filters are used to produce the color signals or a complementary color signal system in which non-colored transparent, yellow, cyan and green based color filters are used to produce the color signals. The color filters have different light transmission depending or the types of the filter so that the red filter, the green filter and the blue filter respectively have different spectrum transmission. Accordingly, when the same amount of light is impinged to the respective filters, the amounts of light transmitted therethrough are different so that the intensities of light irradiated to the plurality of photoelectric conversion cells arranged on a light receiving plane of the image pickup element are different from color to color. The non-colored transparent filter, the yellow filter, the cyan filter and the green filter also have different spectrum transmission. In addition, the spectrum sensitivity of the image pickup element differs depending on a wavelength of light irradiated thereto. As a result, the photoelectric conversion cells disposed correspondingly to the respective color filters are different in sensitivity relatively to each other and in the amount of light at which the respective cells saturate.

Where the photoelectric conversion cells have different saturation characteristics, the primary color system poses no problem because three primary color signals, i.e. red, green and blue color signals, are directly produced, but the complementary color system results in a substantial distortion in a white balance because it produces the primary color signals by arithmetic operation and demodulation and chrominance signals are unbalanced when the light amount of any cell exceeds its saturation level.

It is, therefore, an object of the present invention to provide a color image pickup device which is simple in construction and prevents the distortion of the white balance even at the saturation level.

In order to prevent the distortion of the white balance at the saturation signal level in a color television camera using a single tube or single plate image pickup element, the photoelectric conversion cells disposed correspondingly to the respective color filters may be arranged to have the same saturation point of light amount. However, it is not possible to impart different amounts of light to the photoelectric conversion cells arranged on the same image pickup plane. The present invention is based in the fact that the light amount for saturation of the image pickup element changes with change of a bias voltage applied to a photo-diode in a MOS solid state image pickup element or of a target voltage in an image pickup tube, and arranged to apply different bias voltages or target voltages to the respective groups of photoelectric conversion cells corresponding to the respective color filters so that the cells reach saturation at the same light amount thereby preventing the distortion of the white balance.

Figure 2:
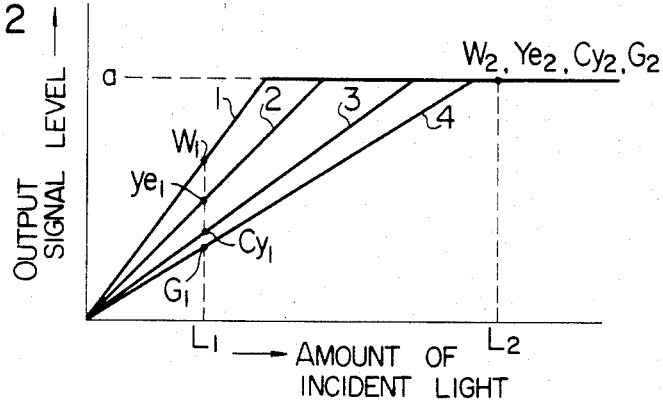
Figure 3:
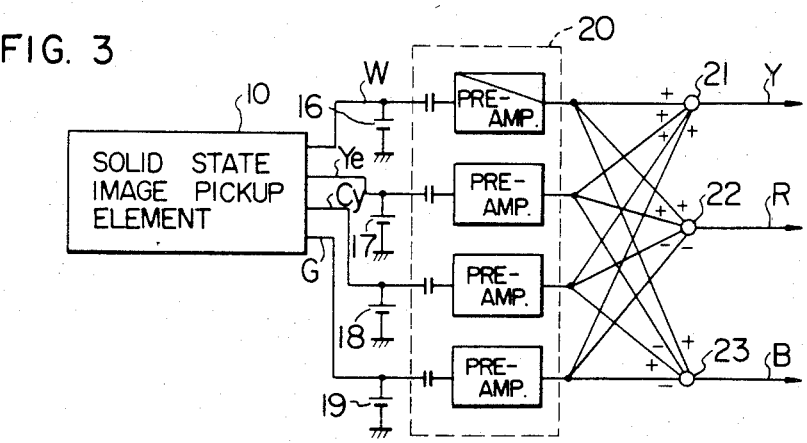
Figure 4:
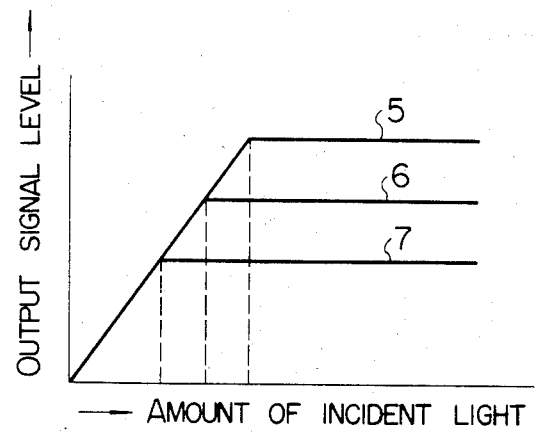
Figure 5:
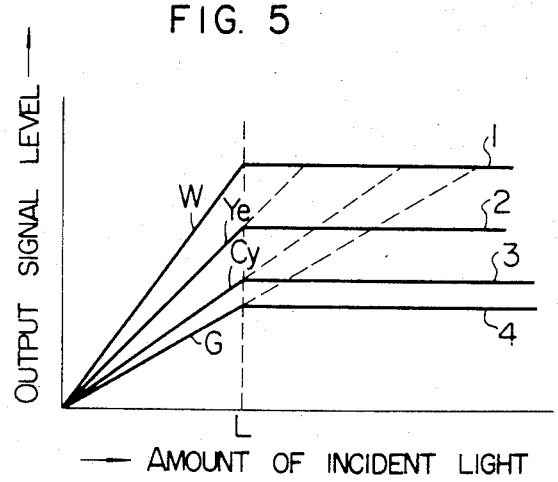
Figure 6:
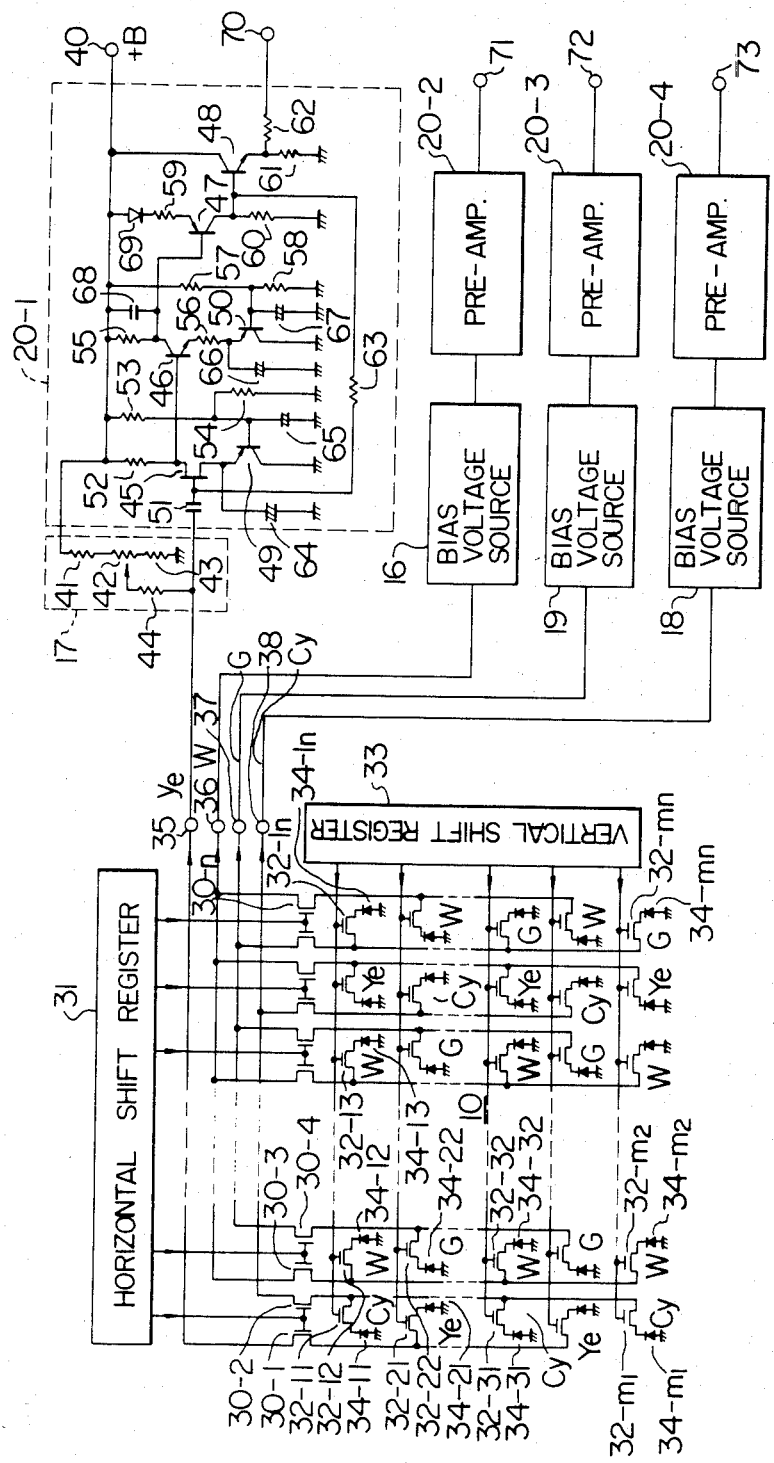

The features and advantages of the present invention will be clearly understood from the following description of the embodiments of the present invention in conjunction with the accompanying drawings in which;

FIG. 1 shows a front view illustrating an arrangement of photoelectric conversion cells of a color image pickup device of the present invention, FIG. 2 is a diagram showing photoelectric conversion characteristics of the photoelectric conversion cells used in the present invention, FIG. 3 shows a block diagram of one embodiment of the color image pickup device of the present invention, FIG. 4 is a diagram showing photoelectric conversion characteristics of the cells obtained when a bias voltage to the photoelectric conversion cells is varied, FIG. 5 is a diagram showing photoelectric conversion characteristics of the color image pickup device of the present invention, and FIG. 6 shows a circuit diagram of the color image pickup device of the present invention.

First, the reasons for the distortion of the white balance in the complementary color system image pickup device will be discussed. FIG. 1 shows an example of arrangement of photoelectric conversion cells corresponding to the respective colors in a color image pickup device of the present invention which uses color separating optical filters of the complementary system. In FIG. 1, all-color photoelectric conversion cells each receiving all-color light transmitted through a non-colored transparent filter are arranged at sections W of an image pickup element 10. Yellow color photoelectric conversion cells each receiving light transmitted through a yellow filter are arranged at sections Ye, green color photoelectric conversion cells each receiving light transmitted through a green filter are arranged at sections G, and cyan color photoelectric conversion cells each receiving light transmitted through a cyan filter are arranged at sections Cy. The affixed subscripts indicate the positions of the sections in matrix arrangement.

In the illustrated arrangement, four picture cells W, Ye, G and Cy constitute one unit and such units are arranged in rows and columns. Signal are read out from the photoelectric conversion cells in the following sequence. Firstly, $W_{11}$ and $G_{21}$ are read, secondly $Ye_{12}$ and $Cy_{22}$ are read, thirdly $W_{13}$ and $G_{23}$ are read, fourthly $Ye_{14}$ and $Cy_{24}$ are read, ..., then $W_{31}$ and $G_{41}$ are read, then $Ye_{32}$ and $Cy_{42}$ are read, then $W_{33}$ and $G_{43}$ are read and so on, that is, a pair of upper and lower picture cells are read at a time. The read-out is effected by sequentially scanning switching circuits each connected to respective one of the photoelectric conversion cells through vertical and horizontal scan circuits. The signals from the photoelectric conversion cells W are collected to a signal wire W, the signals from the photoelectric conversion cells Ye are collected to a signal wire Ye and so on, that is, the respective signals are collected to respective one of the four color signal wires.

The all-color photoelectric conversion cells W are sensitive to red light r, green light g and blue light b, the yellow color conversion cells Ye are sensitive to the green light g and the red light r, the cyan color photoelectric conversion elements Cy are sensitive to the green light g and the blue light b, and the green color photosensitive conversion cells G are sensitive to the green light g. Thus, the output signals from the respective photoelectric conversion cells are represented by the primary color signals, red r, green g and blue g, as shown below:

$$W = r + g + b \tag{1}$$

$$Ye = r + g \tag{2}$$

$$Cy = g + b \tag{3}$$

$$G = g \tag{4}$$

FIG. 2 shows photoelectric conversion characteristics of the photoelectric conversion cells corresponding to the respective colors in which an abscissa represents the amount of light incident to the filter associated with the respective cell and an ordinate represents an output signal level of the cell. In FIG. 2, a characteristic curve 1 shows a conversion characteristic of the all-color photoelectric conversion cell W, a characteristic curve 2 shows a conversion characteristic of the yellow color photoelectric conversion cell Ye, a characteristic curve 3 shows a conversion characteristic of the cyan color photoelectric conversion cell Cy and a characteristic curve 4 shows a conversion characteristic of the green color photoelectric conversion cell G. The output signals from the respective photoelectric conversion cells are classified into two conditions depending on whether the outputs are produced by light below or above the saturation light level. It should be noted that the amount of light or light level is referred, through the specification, to the light incident to the filter associated to the respective cell. The output signals by a light amount $L_1$ which is below the saturation light level are represented by $W_1$, $Ye_1$, $Cy_1$ and $G_1$, and the output signals by a light amount $L_2$ which is above the saturation light level are represented by $W_2$, $Ye_2$, $Cy_2$ and $G_2$.

When the light amount is below the saturation light level a brightness signal $Y_1$, the red signal $R_1$ and the blue signal $B_1$ are given as below by introducing the equations (1), (2), (3) and (4);

$$Y_1 = W + Ye + Cy + G = 2(r + 2g + b) \tag{5}$$

$$R_1 = W + Ye - Cy - G = 2r \tag{6}$$

$$B_1 = W - Ye + Cy - G = 2b \tag{7}$$

The brightness signal $Y_1$ is generally expressed by $Y_1 = 0.3r + 0.59g + 0.11b$. However, since the sensitivity to the blue signal in the image pickup element is usually low, it may be approximated to $Y_1 = 2(r + 2g + b)$. Thus, the brightness signal $Y_1$, the red signal $R_1$ and the blue signals $B_1$ which are the base of the three primary colors can be obtained. However, since the red signal $R_1$ and the blue signal $B_1$ are produced differentially of the signals, the equations (5), (6) and (7) may be imbalance, when the light amount is above the saturation light level due to the difference in the saturation level of light amount between the cells of which the associated color filters are different in sensitivity. For example, at the light amount $L_2$ of FIG. 2, the output signals $W_2$, $Ye_2$, $Cy_2$ and $G_2$ of the respective colors are all at the same level and hence the brightness signal $Y_2$, the red signal $R_2$ and the blue signal $B_2$ are represented as follows:

$$Y_2 = W_2 + Ye_2 + Cy_2 + G_2 = 4W_2 \tag{8}$$

$$R_2 = W_2 + Ye_2 - Cy_2 - G_2 = 0 \tag{9}$$

$$B_2 = W_2 - Ye_2 + Cy_2 - G_2 = 0 \tag{10}$$

As seen from the equations (9) and (10), the red and blue output signals $R_2$ and $B_2$ are zero. Thus, the green signal $G_2$ which is one of the three primary colors is given by;

$$G_2 = Y_2 - R_2 - B_2 = 4W_2 \tag{11}$$

Thus, only the green signal is present, resulting in a highlight green phenomenon which greatly degrades the quality of image.

As seen from the above, when the saturation characteristics of the respective photoelectric conversion cells are different, the imbalance of the chrominance signals takes place for the light amount above the saturation level so that the signals fail to give satisfactorily white balance in reproduced image.

The distortion of white balance which would occur at the light amount above the saturation signal level can be prevented by providing the photoelectric conversion cells corresponding to the respective color filters with the same saturation level of light amount. This may be attained by changing the bias voltage applied to the photodiodes of the MOS solid state image pickup element or the target voltage of the image pickup tube.

FIG. 3 shows a block diagram of one embodiment of the color image pickup device of the present invention. Numeral 10 denotes a solid state image pickup element having transparent, yellow, cyan and green filters disposed in mosaic arrangement, W, Ye, Cy and G denote output signals from the photoelectric conversion cells corresponding to the respective color filters, numerals 16, 17, 18 and 19 denote bias voltage sources for the respective photoelectric conversion cells, numeral 20 denotes preamplifiers for amplifying the output signals of the respective photoelectric conversion cells, numerals 21, 22 and 23 denote matrix circuits for synthesizing the brightness signal Y, the red signal R and the blue signal B. The photoelectric conversion characteristics of the respective color filters as shown in FIG. 2 can be changed by changing the bias voltages applied to the photoelectric conversion cells of the solid state image pickup element 11 to have different saturation signal level.

FIG. 4 shows photoelectric conversion characteristics of the MOS solid state image pickup element, in which characteristic curves 5, 6 and 7 show the photoelectric conversion characteristics with different bias voltages to the photo-diodes. As the reverse bias voltage applied to the photo-diode increases, the saturation output level goes up. The curve 5 is depicted for the highest bias voltage and the curve 7 is depicted for the lowest bias voltage. Thus, the voltages of the four bias voltage sources 16, 17, 18 and 19 are adjusted to change the bias voltages applied to the respective circuits for the chrominance signals relatively to each other so that the saturation points of the light amount are equal for all of the colors. The photoelectric conversion characteristics of the photoelectric conversion cells thus adjusted are shown in FIG. 5. As shown in FIG. 5, by changing the bias voltages for the yellow, cyan and green color photoelectric conversion cells relative to the bias voltage for the photoelectric conversion cell corresponding to the transparent filter, the photoelectric conversion characteristics 1, 2, 3 and 4 of the respective photoelectric conversion cells reach the saturation level of outputs at the same saturation point L of light amount. By setting the voltages of the bias voltage sources 16, 17, 18 and 19 in this manner, the output levels W, Ye, Cy and G of the respective chrominance signals have constant ratios for any light amount and the output signals Y, R and B from the matrix circuits 21, 22 and 23 always satisfy the following equations:

$$Y = W + Ye + Cy + G = 2(r + 2g + b) \tag{12}$$

$$R = W + Ye - Cy - G = 2r \tag{13}$$

$$B = W - Ye + Cy - G = 2b \tag{14}$$

Thus, the white balance is maintained for any light amount and the highlight green phenomenon can be prevented.

FIG. 6 shows a circuit diagram of the color image pickup device of the present invention in which the MOS semiconductor device is used as the image pickup element. The image pickup element 10 has a plurality of horizontal gate transistors 30-1, 30-2, 30-3, 30-4, ... 30-n which are turned on and off by horizontal gate pulses. Gate terminals of the first horizontal gate transistor 30-1 and the second horizontal gate transistors 30-2 are connected together and connected to a horizontal shift register 31. Gate terminals of the third and fourth horizontal gate transistors 30-3 and 30-4 are also connected together and connected to the horizontal shift register 31. Similarly, gate terminals of the other adjacent horizontal gate transistor pairs are connected together and connected to the horizontal shift register 31. The image pickup element 10 further includes a plurality of vertical gate transistors which are turned on and off by vertical gate pulses. For the sake of convenience, the vertical gate transistors arranged laterally on the top row are designated by 32-11, 32-12, 32-13, ... 32-1n, the vertical gate transistors arranged longitudinally on the leftmost column are designated by 32-11, 32-21, 32-31, ... 32-ml, and the vertical gate transistor at the column m and the row n is designated by 32-mn. Gate terminals of the vertical gate transistors on the first row are connected together and connected to a vertical shift register 33. Similarly, the vertical gate transistors on the second, third, ..., n-th rows are connected together, respectively, and connected to the vertical shift register 33. Photo-diodes are connected between source electrodes of the respective gate transistors and ground. For the sake of convenience, the photo-diode arranged laterally on the top row are designated by 34-11, 34-12, 34-13, ... 34-1n and the photo-diodes arranged longitudinally on the leftmost column are designated by 34-11, 34-21, 34-31, ... 34-ml. Lights transmitted through optical filters are irradiated to the photo-diodes, which produce voltages depending on the amounts of incident light. The optical filters for the photo-transistors are designated by Cy, W, Ye and G. A drain electrode of the first horizontal gate transistor 30-1 is connected to a first output terminal 35 and a source electrode thereof is connected to a drain electrode of the vertical gate transistor 32-21 at the row 2 and the column 1. A drain electrode of the second horizontal gate transistor 30-2 is connected to a fourth output terminal 38 and a source electrode thereof is connected to a drain electrode of the vertical gate transistor 32-11 at the row 1 and the column 1 and to a drain electrode of the vertical gate transistor 32-31 at the row 3 and the column 1. A drain electrode of the third horizontal gate transistor 30-3 is connected to a second output terminal 36 and a source electrode thereof is connected to a drain electrode of the vertical gate transistor 32-12 at the row 1 and the column 2 and to a drain electrode of the vertical transistor at the row 3 and the column 2. A drain electrode of the fourth horizontal gate transistor 30-4 is connected to a third output terminal 37 and a source electrode thereof is connected to a drain electrode of the vertical gate transistor 32-22 at the row 2 and the column 2. Connected to the first output terminal 35 are a bias voltage source 17 and a pre-amplifier 20-1. The bias voltage source 17 comprises three resistors 41, 42 and 43 connected in series between a power supply terminal 40 and the ground to divide a power supply voltage and a divided D.C. voltage is taken out of the potentiometer 42 and it is supplied to the first output terminal 35 through a resistor 44. Thus, when the first horizontal gate transistor 30-1 and the row 2-column 1 vertical gate transistors 32-21 are selected and rendered conductive by the output signals of the horizontal shift register 31 and the vertical shift transistor 33, the bias voltage supplied to the first output terminal 35 is fed to the photo-diode 34-21 through the gate transistors 30-1 and 32-21 to control the saturation point of light amount for the photodiode 34-21. The signal voltages developing across the photo-diode 34-21 when the gate transistors 30-1 and 32-21 conduct is fed to the output terminal 35 through the gate transistors 30-1 and 32-21.

The signal supplied to the output terminal 35 is a yellow signal because it is the output signal from the photo-diode 34-21 which corresponds to the yellow filter. This yellow signal is amplified by a pre-amplifier 20-1, which comprises an amplifying field effect transistor 45, amplifying transistors 46, 47 and 48 and biasing transistors 49 and 50. A capacitor 51 is connected to a gate electrode of the transistor 45 to block the D.C. voltage of the bias voltage source 17. The yellow signal is supplied to the transistor 45 through the capacitor 51. The signal amplified by the amplifying transistors 45, 46, 47 and 48 is fed to an output terminal 70 from an emitter of the transistor 48 through a resistor 62.

Bias voltage sources 16, 18 and 19 which are similar in circuit configuration to the bias voltage source 17 and pre-amplifiers 20-2, 20-3 and 20-4 which are similar in circuit configuration to the pre-amplifier 20-1 are connected to the second output terminal 36, the third output terminal 37 and the fourth output terminal 38, respectively. The all-color signal supplied to the output terminal 36 is amplified by the pre-amplifier 20-2 and appears at an output terminal 71. The bias voltage is supplied to the photo-diodes 34-12 and 34-32 corresponding to the non-colored transparent filter from the bias voltage source 16 through the gate transistors 30-3, 32-12 and 32-32. Similarly, the green signal supplied to the third output terminal is amplified by the pre-amplifier 20-3 and the cyan signal supplied to the fourth output terminal 38 is amplified by the pre-amplifier 20-4. The respective output signals are supplied to output terminals 72 and 73. The bias voltage is supplied to the photodiode 34-22 corresponding to the green filter from the bias voltage source 19 and the bias voltage is supplied to the photo-diode 34-11 corresponding to the cyan filter from the bias voltage source 18. The bias voltages are adjusted by changing the resistances of the potentiometers 42 so that the photoelectric conversion characteristics of the respective photo-diodes are brought to substantially the same characteristics as shown in FIG. 5.

In the circuit shown in FIG. 6, the bias voltage source 17 comprises the three resistors and the power supply voltage is divided by the three resistors 41, 42 and 43 to produce the bias voltage. Alternatively, the resistor voltage dividing circuit and the capacitor 51 may be omitted and the gate voltage of the transistor 45 may be used as the bias voltage for the photo-diode. By eliminating the capacitor 51 and connecting the gate electrode of the transistor 45 directly to the output terminal 35, the gate voltage of the transistor 45 is supplied to the image pickup element 10. Since a D.C. feedback is applied to the gate electrode of the transistor 45 through a collector resistor 63 of the transistor 47, the feedback voltage serves as a gate bias voltage for the transistor 45. Thus, by varying the feedback voltage, the bias voltage supplied to the photo-diode can be changed. The feedback voltage may be varied by varying the resistance of a base resistor 53 of the biasing transistor 49 to change a collector current of the transistor 49 so that static bias voltages of the amplifying transistors 45, 46 and 47 are changed.

While it has been described in the illustrated embodiment to completely match the saturation points of light amount for the respective photoelectric conversion cells, the complete balance is not always necessary because a limiter called a white clip is used in a high intensity close to the saturation point of light amount, and a substantial amount of error is permitted. Accordingly, the arrangement in which the transparent and yellow photo-diodes are applied with the same bias voltage and the cyan and green photo-diodes are applied with the same bias voltage different from the former bias voltage can present a substantial effect.

While the solid state image pickup element has been described in the illustrated embodiment, a similar effect can be expected when the target voltages in the image pickup tube are varied.

What is claimed is:

1. A color image pickup device comprising:
    a plurality of photoelectric conversion cells on which light of an object is imaged,
    a plurality of complementary color filters disposed in front of said photoelectric conversion cells,
    means for synthesizing output signals of said photoelectric conversion cells to produce chrominance signals, and
    means coupled between said photoelectric conversion cells and said means for synthesizing for adjusting saturation points of a light amount for said photoelectric conversion cells to be substantially at levels equal to each other.

2. A color image pickup device according to claim 1 wherein said saturation point adjusting means comprises a plurality of amplifiers for amplifying the respective output signals of said photoelectric conversion cells and means for varying bias voltages for said amplifiers.

3. In a color image pickup device including a plurality of photoelectric conversion cells on which light of an object is imaged, a plurality of complementary color filters disposed in front of said photoelectric conversion cells, and means for subjecting output signals of said photoelectric conversion cells to an arithmetic operation to produce chrominance signals, the improvement comprising means coupled between said photoelectric conversion cells and said means for synthesizing for supplying bias voltages in accordance with transmission characteristics of said color filters to said photoelectric conversion cells for causing said photoelectric conversion cells to saturate substantially at levels of light equal to each other.

4. A color image pickup device comprising:
    a plurality of photodiodes disposed in m rows and n columns on a plane;
    a plurality of horizontal gate transistors connected to a horizontal shift register and selectively rendered conductive by an output of said horizontal shift register;
    a plurality of vertical gate transistors connected to said photodiodes, respectively, and also connected to a vertical shift register so that the vertical gate transistors which are connected to the photodiodes disposed in each row are selectively rendered conductive by an output of said vertical shift register;
    a plurality of groups of color filters, each color filter group having a color complementary to colors of the other color filter groups, and color filters being operatively associated with said photodiodes, respectively;
    means for connecting the vertical gate transistors which are connected to the photodiodes disposed in each column and associated with each filter group to a selected one of said horizontal gate transistors so that a color signal produced by any one of said photodiodes disposed in each column and associated with each color filter group is introduced through said selected horizontal gate transistor;
    a plurality of preamplifiers for amplifying the color signals introduced through the respective horizontal gate transistors; and
    a plurality of D.C. bias sources for providing said photodiodes with respective D.C. bias voltages through the respective horizontal gate transistors so that saturation points of a light amount for said photodiodes are at levels substantially equal to each other.

* * * * *